(12) United States Patent
Watanabe et al.

(10) Patent No.: US 11,834,099 B2
(45) Date of Patent: Dec. 5, 2023

(54) VEHICLE BODY STRUCTURE

(71) Applicant: Honda Motor Co., Ltd., Tokyo (JP)

(72) Inventors: Yasunori Watanabe, Saitama (JP);
Satoru Kawabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 127 days.

(21) Appl. No.: 17/403,833

(22) Filed: Aug. 16, 2021

(65) Prior Publication Data

US 2022/0073140 A1  Mar. 10, 2022

(30) Foreign Application Priority Data

Sep. 4, 2020  (JP) .................................. 2020-149205

(51) Int. Cl.
| | | |
|---|---|---|
| *B62D 21/15* | (2006.01) | |
| *B62D 29/00* | (2006.01) | |
| *B62D 33/02* | (2006.01) | |
| *B62D 25/08* | (2006.01) | |
| *B62D 25/20* | (2006.01) | |

(52) U.S. Cl.
CPC ........... *B62D 21/152* (2013.01); *B62D 29/00* (2013.01); *B62D 33/02* (2013.01); *B62D 25/08* (2013.01); *B62D 25/087* (2013.01); *B62D 25/20* (2013.01); *B62D 29/007* (2013.01)

(58) Field of Classification Search
CPC ...... B62D 21/152; B62D 29/00; B62D 33/02; B62D 25/087; B62D 29/007; B62D 25/20; B62D 25/08
USPC ..................................................... 296/187.11
See application file for complete search history.

(56) References Cited

U.S. PATENT DOCUMENTS

| | | |
|---|---|---|
| 5,555,699 A | 9/1996 | Borthick et al. |
| 10,633,032 B2 | 4/2020 | Nakazawa et al. |
| 2014/0193659 A1 | 7/2014 | Lanzerath et al. |
| 2017/0036524 A1* | 2/2017 | Ikeda ..................... B62D 25/20 |
| 2017/0144711 A1* | 5/2017 | Daigaku ................ B62D 21/02 |
| 2017/0210428 A1 | 7/2017 | Hallik et al. |
| 2020/0130747 A1* | 4/2020 | Hasegawa ............ B62D 21/155 |

FOREIGN PATENT DOCUMENTS

| | | |
|---|---|---|
| DE | 102011086813 | 5/2013 |
| JP | S58106281 | 7/1983 |
| JP | S60135374 | 7/1985 |
| JP | S62185181 | 11/1987 |
| JP | H0394137 | 4/1991 |

(Continued)

OTHER PUBLICATIONS

"Office Action of Japan Counterpart Application", dated Aug. 8, 2023, with English translation thereof, p. 1-p. 8.

*Primary Examiner* — Amy R Weisberg
*Assistant Examiner* — Dana D Ivey
(74) *Attorney, Agent, or Firm* — JCIPRNET

(57) ABSTRACT

To actively absorb impact energy by a bead and reduce weight. A vehicle body rear structure 1 of an embodiment includes rear floor panels 2 and 3 formed by a steel plate having a tensile strength of 440 MPa or more. The rear floor panels 2 and 3 have beads 13 and 23 extending in a predetermined direction over an entire surface, and the direction in which the beads 13 and 23 extend and the type of the beads 13 and 23 are set so as to reduce a difference between a peak load and an average load at the time of collision.

11 Claims, 10 Drawing Sheets

(56) References Cited

FOREIGN PATENT DOCUMENTS

| | | |
|---|---|---|
| JP | H0789465 | 4/1995 |
| JP | 2005029064 | 2/2005 |
| JP | 2008247312 | 10/2008 |
| JP | 2013136314 | 7/2013 |
| JP | 5281630 B2 * | 9/2013 |
| JP | 2014000862 | 1/2014 |
| JP | 2017121931 | 7/2017 |
| JP | 2017185958 | 10/2017 |
| WO | 2017119472 | 7/2017 |
| WO | 2019176792 | 9/2019 |

* cited by examiner

VEHICLE BODY STRUCTURE

CROSS-REFERENCE TO RELATED APPLICATION

This application claims the priority benefit of Japan application no. 2020-149205, filed on Sep. 4, 2020. The entirety of the above-mentioned patent application is hereby incorporated by reference herein and made a part of this specification.

BACKGROUND

Technical Field

The disclosure relates to a vehicle body structure.

Related Art

Conventionally, in a vehicle such as an automobile or the like, a structure is known in which a bead (shape) is formed on a part of a vehicle body panel of the vehicle to increase rigidity of the vehicle body panel and absorb deformation.

For example, Patent literature 1 discloses a structure in which a bead extending in a front-rear direction of a vehicle is arranged at a location where a side surface of a wheel house is bonded to a floor panel.

For example, Patent literature 2 discloses a structure in which a bead extending in a front-rear direction of a vehicle is arranged at a center of a rear floor panel in a left-right direction of the vehicle.

For example, Patent literature 3 discloses a structure in which a bead extending in a direction intersecting a vehicle width direction from an outer edge in the vehicle width direction is arranged on a reinforcing plate portion corresponding to a tire house.

LITERATURE OF RELATED ART

Patent Literature

[Patent literature 1] Japanese Patent Laid-Open No. 2017-185958
[Patent literature 2] Japanese Patent Laid-Open No. 2017-121931
[Patent literature 3] Japanese Patent Laid-Open No. 2013-136314

SUMMARY

However, in Patent literatures 1 to 3, it is not assumed to reduce weight by the bead actively absorbing impact energy.

Thus, an objective of the disclosure is to provide a vehicle body structure that can actively absorb impact energy by a bead and reduce weight.

(1) A vehicle body structure (for example, a vehicle body rear structure 1 in an embodiment) according to one aspect of the disclosure includes a panel (for example, a rear upper panel 2 in an embodiment) formed by a steel plate having a tensile strength of 440 MPa or more. The panel has a bead (for example, a vertical bead 13 in an embodiment) extending in a predetermined direction (for example, a load input direction V1 in an embodiment) over an entire surface, and the direction in which the bead extends and the type of the bead are set so as to reduce a difference between a peak load (for example, a peak load Lp in an embodiment) and an average load (for example, an average load La in an embodiment) at the time of collision.

(2) In one aspect of the disclosure, the panel may have an uneven surface (for example, an uneven surface 315 in an embodiment) formed by a plurality of ridge lines (for example, ridge lines 313 and 314 in an embodiment), and the bead may be arranged on the uneven surface across the ridge lines.

(3) In one aspect of the disclosure, the panel may include: a plurality of vertical beads (for example, vertical beads 406 in an embodiment) that extend in a load input direction (for example, a load input direction V1 in an embodiment) at the time of collision and line up in a direction orthogonal to the load input direction (for example, an input orthogonal direction V2 in an embodiment); and a plurality of lateral beads (for example, lateral beads 407 in an embodiment) that extend in the direction orthogonal to the load input direction and line up in the load input direction.

(4) In one aspect of the disclosure, the panel may be a rear floor panel (for example, a rear lower panel 203 in an embodiment), the rear floor panel may have a plurality of lateral beads (for example, lateral beads 224 in an embodiment) that extend in the direction orthogonal to the load input direction at the time of collision and line up in the load input direction, and a rear portion of the rear floor panel (for example, a second lower panel 222 in an embodiment) may have a higher strength than that of a front portion of the rear floor panel (for example, a first lower panel 221 in an embodiment).

(5) In one aspect of the disclosure, the panel may be a rear floor panel (for example, a rear floor panel 502 in an embodiment), the rear floor panel may have a plurality of vertical beads (for example, vertical beads 503 in an embodiment) that extend in the load input direction at the time of collision and line up in the direction orthogonal to the load input direction, and each of the plurality of vertical beads may have a wavy shape over the direction in which the vertical beads extend.

(6) In one aspect of the disclosure, the panel may be a rear floor panel (for example, a rear upper panel 202 in an embodiment), and the rear floor panel may have: a plurality of lateral beads (for example, lateral beads 214 in an embodiment) that extend in the direction orthogonal to the load input direction at the time of collision and line up in the load input direction; and a plurality of vertical beads (for example, vertical beads 213 in an embodiment) that extend in the load input direction, line up in the direction orthogonal to the load input direction, and connect the plurality of lateral beads adjacent to each other.

(7) In one aspect of the disclosure, the panel may have a plurality of arc-shaped beads (for example, arc-shaped beads 603 in an embodiment) that are curved in an arc shape toward the same side as the load input direction at the time of collision or a side opposite to the load input direction, and line up in the load input direction.

(8) In one aspect of the disclosure, the panel may have a plurality of U-shaped beads (for example, U-shaped beads 703 in an embodiment) having a U-shape which opens toward the same side as the load input direction at the time of collision or a side opposite to the load input direction, and line up in the load input direction.

(9) In one aspect of the disclosure, the panel may have: a plurality of lateral beads (for example, lateral beads 803 in an embodiment) that extend in the direction orthogonal to the load input direction at the time of collision, line up in the load input direction, and have a V-shaped region (for example, a V-shaped region 805 in an embodiment) that has a V-shape and opens toward the same side as the load input direction or a side opposite to the load input direction; and a plurality of vertical beads (for example, vertical beads 804 in an embodiment) that extend in the load input direction, line up in the direction orthogonal to the load input direction, and bite into the V-shaped region.

(10) In one aspect of the disclosure, the panel may have: a plurality of sloping beads (for example, sloping beads 903 in an embodiment) that extend in a direction diagonally intersecting the load input direction at the time of collision, line up in the load input direction, and have a V-shaped region (for example, a V-shaped region 905 in an embodiment) that has a V-shape and opens toward the same side as the load input direction or a side opposite to the load input direction; and a plurality of vertical beads (for example, vertical beads 904 in an embodiment) that extend in the load input direction, line up in the direction orthogonal to the load input direction, and bite into the V-shaped region.

(11) In one aspect of the disclosure, a pair of the panels may be arranged in an up-down direction of a vehicle, and the vehicle body structure may further include a support member (for example, a support member 4 in an embodiment) that extends in the load input direction at the time of collision and connects the pair of the panels.

(12) In one aspect of the disclosure, the panel may be a hot stamp molded product, and a part of the panel on a side to which a load at the time of collision is input (for example, a rear portion 402B of a rear upper panel in an embodiment) is uncured.

(13) In one aspect of the disclosure, the panel may be a rear floor panel (for example, a rear upper panel 2 in an embodiment), and the vehicle body structure may further include a rear bumper beam (for example, a rear bumper beam 5 in an embodiment) that is continuously connected to a rear edge of the rear floor panel (for example, a rear edge 11a in an embodiment) in a vehicle width direction.

According to the above aspect (1), the panel formed by the steel plate having a tensile strength of 440 MPa or more is included, the panel has the bead extending in the predetermined direction over the entire surface, the direction in which the bead extends and the type of the bead are set so as to reduce the difference between the peak load and the average load at the time of collision, and thereby the following effects are achieved.

By reducing the difference between the peak load and the average load at the time of collision, a generation load of the panel can be controlled and an absorption efficiency of an impact energy in the panel can be improved. In addition, the weight can be reduced because there is no need to rely on a heavy closed-sectional skeletal frame. Thus, the impact energy can be actively absorbed by the bead and the weight can be reduced.

According to the above aspect (2), the panel has the uneven surface formed by the plurality of ridge lines, the bead is arranged on the uneven surface across the ridge line, and thereby the following effects are achieved.

The ridge line can increase rigidity in a load direction, the bead arranged on the uneven surface across the ridge line can be easily crushed and deformed, and the difference between the peak load and the average load can be further reduced. In addition, the existing vehicle body panel having the uneven surface can be utilized as the panel, eliminating a need for additional parts. Thus, the weight of the vehicle body structure can be reduced and a collision performance can be improved.

According to the above aspect (3), the panel includes the plurality of vertical beads that extend in the load input direction at the time of collision and line up in the direction orthogonal to the load input direction, and the plurality of lateral beads that extend in the direction orthogonal to the load input direction and line up in the load input direction, and thereby the following effects are achieved.

Compared with a case where the panel has only the plurality of vertical beads or a case where the panel has only the plurality of lateral beads, the peak load at the time of collision can be reduced, and the difference between the peak load and the average load can be further reduced. Thus, the impact energy can be absorbed more actively by the bead.

According to the above aspect (4), the panel is the rear floor panel, the rear floor panel has the plurality of lateral beads that extend in the direction orthogonal to the load input direction at the time of collision and line up in the load input direction, the rear portion of the rear floor panel has a higher strength than that of the front portion of the rear floor panel, and thereby the following effects are achieved.

Compared with the vertical bead, in a case of the lateral bead, the peak load at the time of collision is likely to be reduced and an impact is likely to be absorbed, but there is a possibility that a vehicle body may be damaged by light collision with a load lower than intended energy absorption for high-speed collision. On the other hand, according to this embodiment, by increasing the strength of the rear portion compared with the front portion of the rear floor panel, damage to the vehicle body caused by the light collision can be suppressed.

According to the above aspect (5), the panel is the rear floor panel, the rear floor panel has the plurality of vertical beads that extend in the load input direction at the time of collision and line up in the direction orthogonal to the load input direction, each of the plurality of vertical beads has a wavy shape over the direction in which the vertical bead extends, and thereby the following effects are achieved.

By increasing a depth of a concave portion of the vertical bead having a wavy shape, the peak load at the time of collision can be easily reduced. Additionally, by changing a pitch and a slope angle of the wavy shape of the concave portion, the peak load at the time of collision can be changed, the generation load can be changed for each portion, and therefore collapsed locations of the entire panel can be controlled.

According to the above aspect (6), the panel is the rear floor panel, and the rear floor panel has: the plurality of lateral beads that extend in the direction orthogonal to the load input direction at the time of collision and line up in the load input direction; and the plurality of vertical beads that extend in the load input direction, line up in the direction orthogonal to the load input direction, and connect the plurality of lateral beads adjacent to each other. Thereby, the following effects are achieved.

By combining the vertical bead that is likely to increase the peak load at the time of collision and the lateral bead that is likely to reduce the peak load, the peak load at the time of collision can be easily reduced. Additionally, by changing a pitch and a slope angle of each bead, the peak load at the time of collision can be changed.

According to the above aspect (7), the panel has the plurality of arc-shaped beads that are curved in an arc shape toward the same side as the load input direction or the side opposite to the load input direction at the time of collision and line up in the load input direction, and thereby the following effects are achieved.

Compared with the case where the panel has only the plurality of lateral beads, the peak load at the time of collision can be increased and a deformation form of the entire panel can be controlled.

According to the above aspect (8), the panel has the plurality of U-shaped beads having a U-shape which opens toward the same side as the load input direction or the side opposite to the load input direction at the time of collision and line up in the load input direction, and thereby the following effects are achieved.

Compared with the case where the panel has only the plurality of vertical beads, the peak load at the time of collision can be reduced.

According to the above aspect (9), the panel has: the plurality of lateral beads that extend in the direction orthogonal to the load input direction at the time of collision, line up in the load input direction, and have the V-shaped region that has a V-shape and opens toward the same side as the load input direction or the side opposite to the load input direction; and the plurality of vertical beads that extend in the load input direction, line up in the direction orthogonal to the load input direction, and bite into the V-shaped region. Thereby, the following effects are achieved.

Compared with a case where the panel has a structure in which the plurality of vertical beads and the plurality of lateral beads are simply combined, the peak load at the time of collision can be increased.

According to the above aspect (10), the panel has: the plurality of sloping beads that extend in the direction diagonally intersecting the load input direction at the time of collision, line up in the load input direction, and have the V-shaped region that has a V-shape and opens toward the same side as the load input direction or the side opposite to the load input direction; and the plurality of vertical beads that extend in the load input direction, line up in the direction orthogonal to the load input direction, and bite into the V-shaped region. Thereby, the following effects are achieved.

Compared with the case where the panel has only the plurality of vertical beads, the peak load at the time of collision can be reduced.

According to the above aspect (11), the pair of the panels is arranged in the up-down direction of the vehicle, the vehicle body structure further includes the support member that extends in the load input direction at the time of collision and connects the pair of the panels, and thereby the following effects are achieved.

Because the vehicle body structure of the disclosure has a double panel structure, the vehicle body structure can sufficiently withstand a collision load without a frame. In addition, the absence of the frame allows for weight reduction. In addition, because the panel is divided into small areas by the support member, shear deformation can be maximized.

According to the above aspect (12), the panel is the hot stamp molded product, the part of the panel on the side to which the load at the time of collision is input is uncured, and thereby the following effects are achieved.

Because the hot stamp molded product is formed by heat press molding, the bead can be easily formed into a desired shape. In addition, by stopping heating or slowly cooling the uncured part (a part to be softened) in the panel, the peak load at the time of collision can be easily reduced.

According to the above aspect (13), the panel is the rear floor panel, the vehicle body structure further includes the rear bumper beam that is continuously connected to the rear edge of the rear floor panel in the vehicle width direction, and thereby the following effects are achieved.

Because the rear bumper beam is continuously supported in the vehicle width direction, the impact energy is absorbed by crushing (a mode in which crush occurs continuously) rather than by local bending. Thus, the weight of the rear bumper beam can be reduced.

DESCRIPTION OF THE EMBODIMENTS

Figure 1:
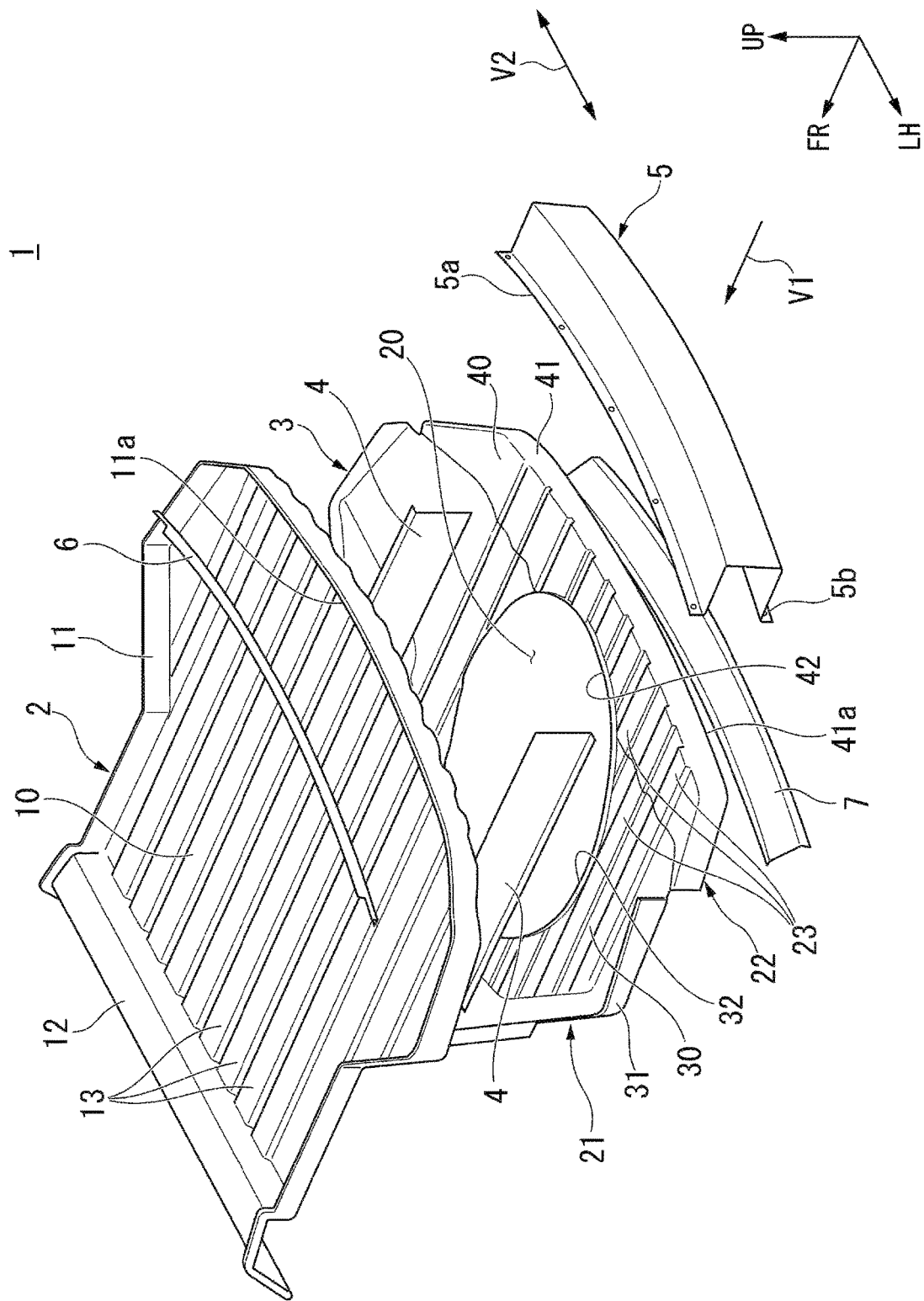
FIG. 1 is an exploded perspective view of a vehicle body rear structure according to a first embodiment.

Hereinafter, embodiments of the disclosure are described with reference to the drawings. In the embodiments, a rear portion (vehicle body rear structure) of an automobile (vehicle) is described. Unless otherwise stated, directions such as front, rear, left, right, and the like in the following description are the same as directions in a vehicle described below. An arrow FR indicating the front of the vehicle, an arrow LH indicating the left of the vehicle, and an arrow UP indicating the upper side of the vehicle are shown at appropriate places in the drawings used in the following description.

<Vehicle Body Rear Structure>

As shown in FIG. 1, a vehicle body rear structure 1 includes a rear upper panel 2 (rear floor panel), a rear lower panel 3 (rear floor panel), a pair of left and right support members 4, a rear bumper beam 5, a rear upper gusset 6, and a rear lower gusset 7. The vehicle body rear structure 1 has a double floor structure including a pair of upper and lower rear floor panels 2 and 3 (the rear upper panel 2 and the rear lower panel 3). The vehicle body rear structure 1 is obtained by combining a plurality of members formed by a high tensile steel plate (for example, a steel plate having a tensile strength of 440 MPa or more).

<Rear Upper Panel>

The rear upper panel 2 functions as a floor portion at a rear portion of a vehicle body. For example, the rear upper panel 2 is formed by a steel plate having a tensile strength of 1400

MPa or more and 1600 MPa or less. For example, a plate thickness of the rear upper panel 2 is set to 0.5 mm or more and 0.8 mm or less.

The rear upper panel 2 includes an upper panel main body 10 arranged substantially horizontally, and an upper peripheral wall 11 standing upward along an outer periphery of the upper panel main body 10. A rear portion of the rear upper panel 2 bulges outward in a vehicle width direction (left-right direction) from a front portion of the rear upper panel 2. A rear portion of the upper peripheral wall 11 of the rear upper panel 2 has a rear edge 11a having arc shape that curves toward the rear of the vehicle.

The rear upper panel 2 has a bulging portion 12 extending in the vehicle width direction and a plurality of vertical beads 13 extending in a front-rear direction. The bulging portion 12 is arranged on a front end portion of the rear upper panel 2. The bulging portion 12 bulges upward when viewed from the vehicle width direction. The bulging portion 12 has a trapezoidal cross-sectional shape that opens downward in a cross-sectional view orthogonal to the direction in which the bulging portion 12 extends.

The plurality of vertical beads 13 extend in the front-rear direction on the upper panel main body 10. The plurality of vertical beads 13 line up in the vehicle width direction. Each interval between the plurality of vertical beads 13 in the vehicle width direction (an interval between two adjacent vertical beads 13) is the same. The vertical bead 13 bulges upward when viewed from the front-rear direction. The vertical bead 13 has a trapezoidal cross-sectional shape that opens downward in a cross-sectional view orthogonal to the direction in which the vertical bead 13 extends.

<Rear Lower Panel>

The rear lower panel 3 is arranged below the rear upper panel 2. The rear lower panel 3 has an opening portion 20 that opens in an up-down direction. The opening portion 20 is arranged in a center of the rear lower panel 3. The rear lower panel 3 includes a first lower panel 21 that constitutes a front portion of the rear lower panel 3 and a second lower panel 22 that constitutes a rear portion of the rear lower panel 3.

The first lower panel 21 includes a first lower panel main body 30 arranged substantially horizontally, and a lower front peripheral wall 31 standing upward along an outer periphery of the first lower panel main body 30 excluding a rear end portion. The first lower panel main body 30 has a front concave portion 32 that constitutes the opening portion 20. For example, the first lower panel 21 is formed by a steel plate having a tensile strength of 1400 MPa or more and 1600 MPa or less. For example, a plate thickness of the first lower panel 21 is set to 0.5 mm or more and 0.8 mm or less. For example, the first lower panel 21 and the rear upper panel 2 are formed by steel plates having the same strength and plate thickness as each other.

The second lower panel 22 has a higher strength than that of the first lower panel 21. The second lower panel 22 includes a second lower panel main body 40 arranged substantially horizontally, and a lower rear peripheral wall 41 standing downward along an outer periphery of the second lower panel main body 40 excluding a front end portion. The second lower panel main body 40 has a rear concave portion 42 that constitutes the opening portion 20. For example, the second lower panel 22 is formed by a steel plate having a tensile strength of 1400 MPa or more and 1600 MPa or less. For example, a plate thickness of the second lower panel 22 is set to 1.8 mm or more and 2.2 mm or less. The strength of the second lower panel 22 is increased by making the plate thickness larger than that of the first lower panel 21.

A front end portion of the second lower panel 22 (a part excluding the rear concave portion 42) is connected to a rear end portion of the first lower panel 21 (a part excluding the front concave portion 32) from below. A rear portion of the lower rear peripheral wall 41 of the second lower panel 22 has an arc-shaped rear edge 41a that curves toward the rear of the vehicle. The rear edge 41a of the second lower panel 22 is formed in a manner of overlapping the rear edge 11a of the rear upper panel 2 when viewed from the up-down direction.

The rear lower panel 3 has a plurality of vertical beads 23 extending in the front-rear direction. The plurality of vertical beads 23 extend in the front-rear direction on a part of a rear panel excluding the opening portion 20. The plurality of vertical beads 23 extend continuously in the front-rear direction across a part of the first lower panel 21 excluding the front concave portion 32 and a part of the second lower panel 22 excluding the rear concave portion 42. The plurality of vertical beads 23 line up in the vehicle width direction. Each interval between the plurality of vertical beads 23 in the vehicle width direction (an interval between two adjacent vertical beads 23) is the same. The vertical bead 23 bulges upward when viewed from the front-rear direction. The vertical bead 23 has a trapezoidal cross-sectional shape that opens downward in a cross-sectional view orthogonal to the direction in which the vertical bead 23 extends.

<Support Member>

The support member 4 is arranged between the rear upper panel 2 and the rear lower panel 3. A pair of support members 4 is arranged in the vehicle width direction with the opening portion 20 of the rear lower panel 3 sandwiched therebetween. The support member 4 connects the rear upper panel 2 and the rear lower panel 3. The support member 4 has a plate shape that extends in the front-rear direction and has a thickness in the vehicle width direction.

For example, the support member 4 is formed by a steel plate having a tensile strength of 900 MPa or more and 1060 MPa or less. For example, a plate thickness of the support member 4 is set to 1.8 mm or more and 2.2 mm or less. For example, the pair of support members 4 is formed by steel plates having the same strength and plate thickness as each other.

<Rear Bumper Beam>

The rear bumper beam 5 has an arc shape that extends in the vehicle width direction and gently curves rearward when viewed from the up-down direction. The rear bumper beam 5 has a hat-shaped (U-shaped) cross-sectional shape that opens forward in a cross-sectional view orthogonal to the direction in which the rear bumper beam 5 extends. For example, the rear bumper beam 5 is formed by a steel plate having a tensile strength of 900 MPa or more and 1060 MPa or less. For example, a plate thickness of the rear bumper beam 5 is set to 1.6 mm or more and 2.0 mm or less.

The rear bumper beam 5 is connected to each of the rear upper panel 2 and the rear lower panel 3. The rear bumper beam 5 includes an upper edge 5a that curves along the rear edge 11a of the rear upper panel 2, and a lower edge 5b that curves along the rear edge 41a of the rear lower panel 3. The upper edge 5a of the rear bumper beam 5 is continuously connected to the rear edge 11a of the rear upper panel 2 in the vehicle width direction. The lower edge 5b of the rear bumper beam 5 is continuously connected to the rear edge 41a of the rear lower panel 3 in the vehicle width direction.

<Rear Upper Gusset>

The rear upper gusset 6 has an arc shape that extends in the vehicle width direction and gently curves along the rear edge 11a of the rear upper panel 2. The rear upper gusset 6 is continuously connected to a rear end portion of the rear upper panel 2 in the vehicle width direction. For example, the rear upper gusset 6 is formed by a steel plate having a tensile strength of 900 MPa or more and 1060 MPa or less. For example, a plate thickness of the rear upper gusset 6 is set to 1.8 mm or more and 2.2 mm or less.

<Rear Lower Gusset>

The rear lower gusset 7 has an arc shape that extends in the vehicle width direction and gently curves along the rear edge 41a of the rear lower panel 3. The rear lower gusset 7 is continuously connected to a rear end portion of the rear lower panel 3 in the vehicle width direction. For example, the rear lower gusset 7 is formed by a steel plate having a tensile strength of 900 MPa or more and 1060 MPa or less. For example, a plate thickness of the rear lower gusset 7 is set to 1.8 mm or more and 2.2 mm or less. For example, the rear upper gusset 6 and the rear lower gusset 7 are formed by steel plates having the same strength and plate thickness as each other.

<Relationship Between Load and Displacement at the Time of Collision>

Figure 2:
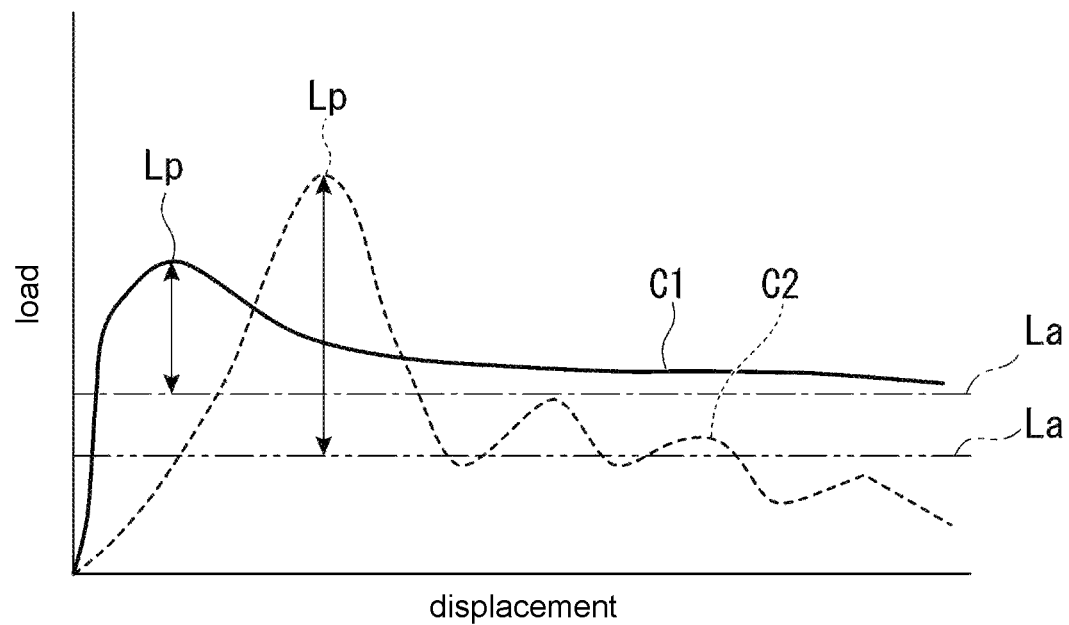
FIG. 2 is a diagram showing a relationship between a load and a displacement at the time of collision.

In FIG. 2, respectively, a vertical axis shows a load at the time of collision, a horizontal axis shows a displacement at the time of collision, a solid line graph C1 shows an embodiment, and a broken line graph C2 shows a comparative example. For example, the comparative example corresponds to a structure in which the impact energy is actively absorbed by a frame instead of the rear floor panel.

As shown in FIG. 2, a peak load Lp of the embodiment is smaller than a peak load Lp of the comparative example. An average load La (a dot chain line) of the embodiment is larger than an average load La (two-dot chain line) of the comparative example.

As described above, the vehicle body rear structure 1 of the embodiment includes a pair of rear floor panels 2 and 3 formed by a steel plate having a tensile strength of 440 MPa or more. The rear floor panels 2 and 3 have beads 13 and 23 extending in a predetermined direction over an entire surface. In the embodiment, the direction in which the beads 13 and 23 extend and the type of the beads 13 and 23 are set so as to reduce a difference between the peak load Lp and the average load La at the time of collision.

Here, it is assumed that an impact load is input to the vehicle body rear structure 1 from the rear of the vehicle. A sign V1 in FIG. 1 indicates a load input direction at the time of collision, and the load input direction V1 corresponds to a direction along the front-rear direction from a rear side to a front side. A direction V2 orthogonal to the load input direction V1 (hereinafter, also referred to as "input orthogonal direction V2") corresponds to the vehicle width direction.

When the load input direction V1 and the input orthogonal direction V2 are set in this way, the rear upper panel 2 has the plurality of vertical beads 13 that extend in the load input direction V1 and line up in the input orthogonal direction V2. The rear lower panel 3 has the plurality of vertical beads 23 that extend in the load input direction V1 and line up in the input orthogonal direction V2.

In the embodiment, in order to reduce the difference between the peak load Lp and the average load La at the time of collision, the strength of the rear upper panel 2 (for example, a tensile strength of 1400 MPa or more and 1600 MPa or less), the strength of the rear lower panel 3 (for example, a tensile strength of 1400 MPa or more and 1600 MPa or less), the plate thickness of the rear upper panel 2 (for example, a plate thickness of 0.5 mm or more and 0.8 mm or less), and the plate thickness of the rear lower panel 3 (for example, the plate thickness of the first lower panel 21 is a plate thickness of 0.5 mm or more and 0.8 mm or less, and the plate thickness of the second lower panel 22 is a plate thickness of 1.8 mm or more and 2.2 mm or less) are respectively set, and the plurality of vertical beads 13 are set in the rear upper panel 2 and the plurality of vertical beads 23 are set in the rear lower panel 3.

<Action Effect>

As described above, the vehicle body rear structure 1 of the above embodiment includes the rear floor panels 2 and 3 formed by a steel plate having a tensile strength of 440 MPa or more. The rear floor panels 2 and 3 have the beads 13 and 23 extending in the predetermined direction over the entire surface. The direction in which the beads 13 and 23 extend and the type of the beads 13 and 23 are set so as to reduce the difference between the peak load Lp and the average load La at the time of collision. With the above configuration, the following effects are achieved.

By reducing the difference between the peak load Lp and the average load La at the time of collision, a generation load of the rear floor panels 2 and 3 can be controlled, and an absorption efficiency of the impact energy in the rear floor panels 2 and 3 can be improved. In addition, the weight can be reduced because there is no need to rely on a heavy closed-sectional skeletal frame. Thus, the impact energy can be actively absorbed by the beads 13 and 23 and the weight can be reduced.

In the above embodiment, a pair of rear floor panels 2 and 3 is arranged in the up-down direction of the vehicle. The vehicle body rear structure 1 includes the support member 4 that extends in the load input direction V1 at the time of collision and connects the pair of rear floor panels 2 and 3. With the above configuration, the following effects are achieved.

Because the vehicle body structure of the disclosure has a double panel structure, the vehicle body structure can sufficiently withstand a collision load without a frame. In addition, the absence of the frame allows for weight reduction. In addition, because the rear floor panels 2 and 3 are divided into small areas by the support member 4, shear deformation can be maximized.

In the above embodiment, the vehicle body rear structure 1 includes the rear bumper beam 5 that is continuously connected to the rear edges 11a and 41a of the rear floor panels 2 and 3 in the vehicle width direction, and thereby the following effects are achieved.

Because the rear bumper beam 5 is continuously supported in the vehicle width direction, the impact energy is absorbed by crushing (a mode in which crush occurs continuously) rather than by local bending. Thus, the weight of the rear bumper beam 5 can be reduced.

Second Embodiment

Figure 3:
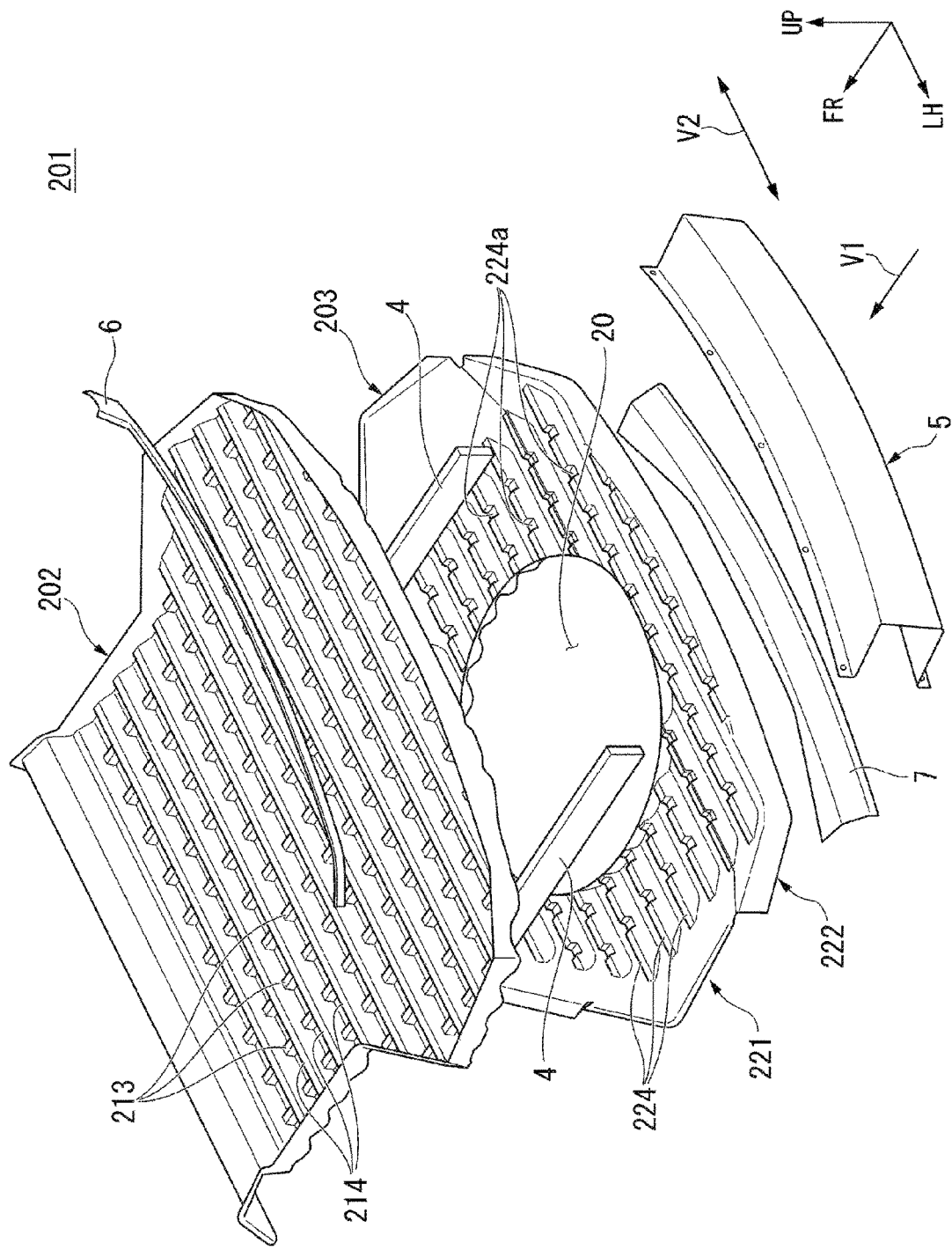
FIG. 3 is an exploded perspective view of a vehicle body rear structure according to a second embodiment.

In the first embodiment, an example in which the vertical beads are arranged on the rear floor panels has been described, but the disclosure is not limited thereto. As shown in FIG. 3, a second embodiment differs from the first embodiment described above in an aspect of a bead on a floor panel of a vehicle body rear structure 201. Note that, in the following description, the same configurations as those in the above-described first embodiment are designated by the same signs and the descriptions thereof are omitted.

Figure 4:
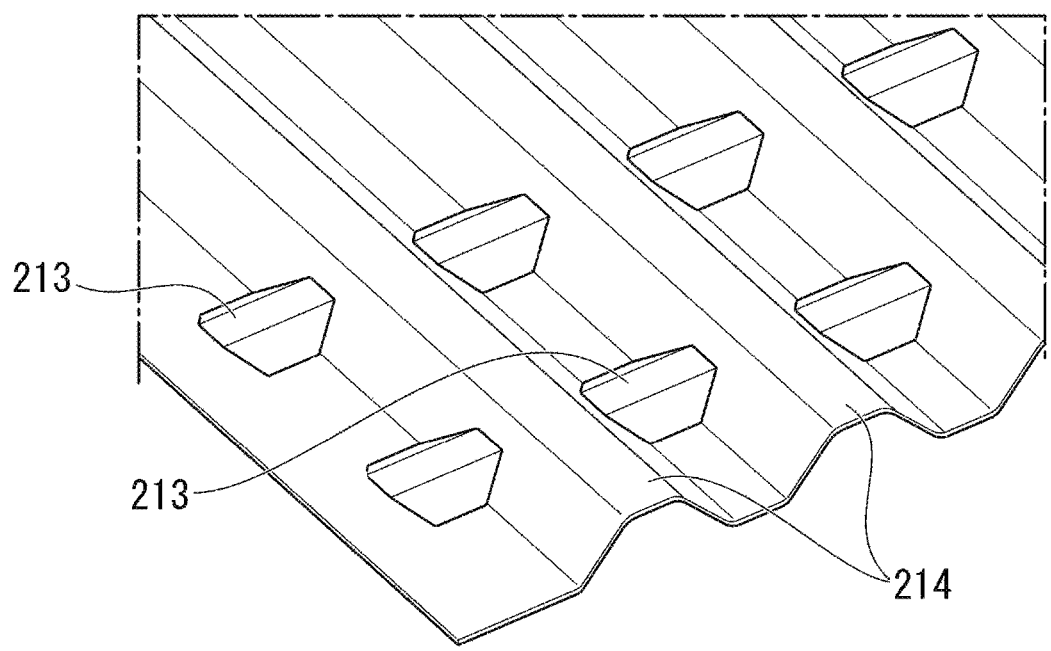
FIG. 4 is a perspective view of a rear floor panel according to the second embodiment.

As shown in FIG. 3, the rear upper panel 202 has: a plurality of lateral beads 214 that extend in the input orthogonal direction V2 and line up in the load input direction V1; and a plurality of vertical beads 213 that extend in the load input direction V1, line up in the input orthogonal direction V2, and connect the plurality of lateral beads 214 adjacent to each other. The plurality of lateral beads 214 and the plurality of vertical beads 213 are arranged on the rear upper panel 202 in a grid pattern. For example, a pitch of the vertical beads 213 (a distance between centers of two adjacent vertical beads 213) is set to 90 mm or more and 110 mm or less. As shown in FIG. 4, a maximum height of the vertical bead 213 is set smaller than a maximum height of the lateral bead 214. The lateral bead 214 has a trapezoidal cross-sectional shape that opens downward in a cross-sectional view orthogonal to the direction in which the lateral bead 214 extends.

As shown in FIG. 3, a rear lower panel 203 has a plurality of lateral beads 224 that extend in the input orthogonal direction V2 and line up in the load input direction V1. A rear portion of the rear lower panel 203 (second lower panel 222) is made thicker than a front portion of the rear lower panel 203 (first lower panel 221) to increase the strength.

On the rear lower panel 203, each of the plurality of lateral beads 224 has a plurality of concave portions 224a that line up in the direction in which the lateral bead 224 extends. Each interval between the plurality of concave portions 224a in the vehicle width direction (an interval between two adjacent concave portions 224a) is the same.

According to the second embodiment, the rear upper panel 202 has the plurality of lateral beads 214 that extend in the input orthogonal direction V2 at the time of collision and line up in the load input direction V1, and the plurality of vertical beads 213 that extend in the load input direction V1, line up in the input orthogonal direction V2, and connect the plurality of lateral beads 214 adjacent to each other, and thereby the following effects are achieved.

By combining the vertical bead 213 that is likely to increase the peak load Lp at the time of collision and the lateral bead 214 that is likely to reduce the peak load Lp, the peak load Lp at the time of collision can be easily reduced. Additionally, by changing a pitch and a slope angle of each of the beads 213 and 214, the peak load Lp at the time of collision can be changed.

In the second embodiment, the rear lower panel 203 has the plurality of lateral beads 224 that extend in the input orthogonal direction V2 at the time of collision and line up in the load input direction V1. The rear portion of the rear lower panel 203 has a higher strength than that of the front portion of the rear lower panel 203. With the above configuration, the following effects are achieved.

Compared with the vertical bead, in a case of the lateral bead, the peak load Lp at the time of collision is likely to be reduced and an impact is likely to be absorbed, but there is a possibility that a vehicle body may be damaged by light collision with a load lower than intended energy absorption for high-speed collision. On the other hand, according to this embodiment, by increasing the strength of the rear portion compared with the front portion of the rear floor panel 203, damage to the vehicle body caused by the light collision can be suppressed.

Third Embodiment

In the first embodiment, an example in which the vehicle body rear structure has the double floor structure including the pair of upper and lower rear floor panels has been described, but the disclosure is not limited thereto. A third embodiment differs from the first embodiment described above in an aspect of a rear floor panel of a vehicle body rear structure. Note that, in the following description, the same configurations as those in the first embodiment described above are designated by the same signs and the descriptions thereof are omitted.

Figure 5:
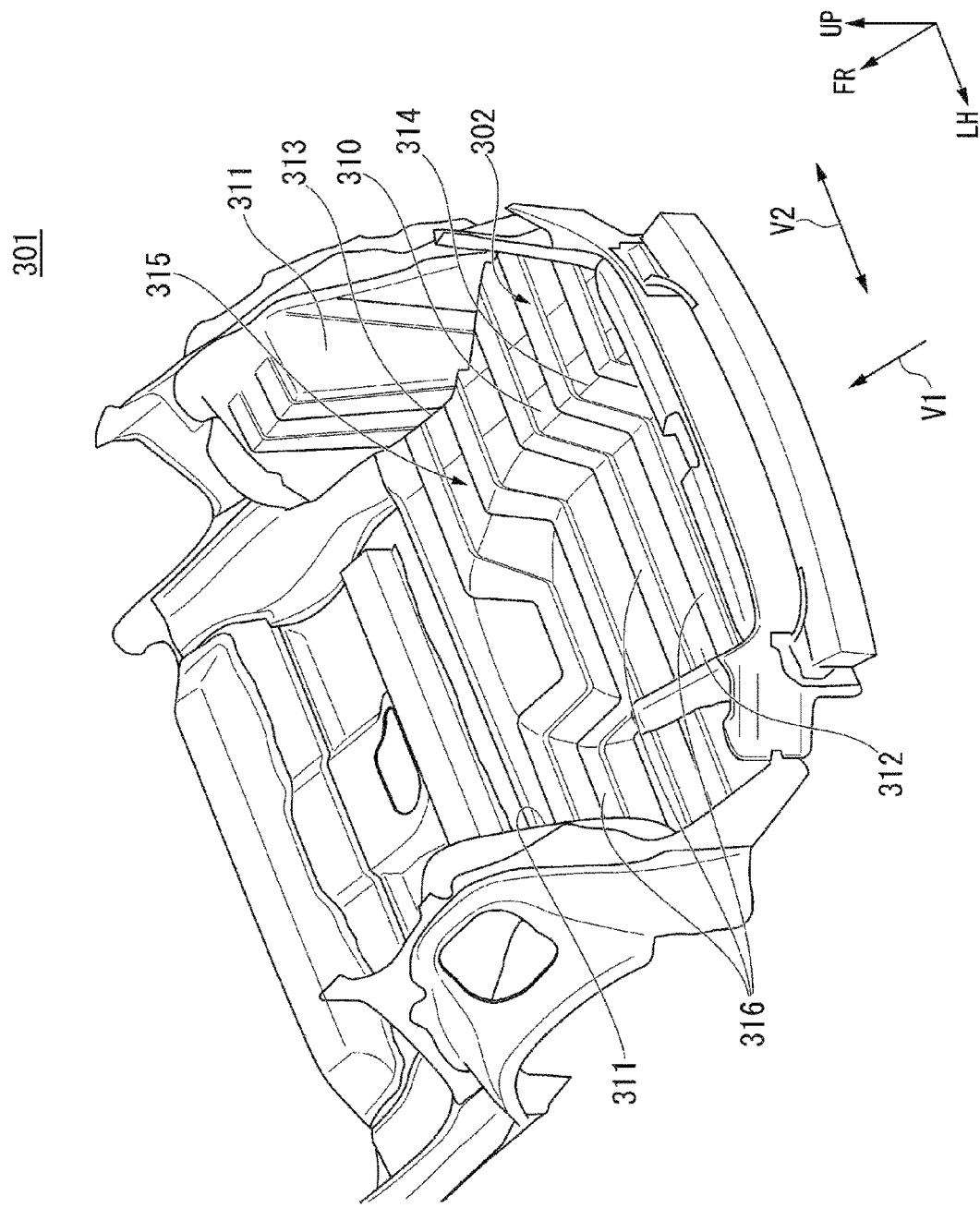
FIG. 5 is a perspective view of a vehicle body rear structure according to a third embodiment.

As shown in FIG. 5, a vehicle body rear structure 301 includes a single rear floor panel 302. The rear floor panel 302 includes: a floor panel main body 310 arranged substantially horizontally; a pair of left and right tire houses 311 that bulge upward from an outer end portion of the floor panel main body 310 in the vehicle width direction; and a tire pan 312 recessed downward from a center of the floor panel main body 310. In FIG. 5, a sign 313 indicates a ridge line formed at a boundary between the floor panel main body 310 and the tire house 311, and a sign 314 indicates a ridge line formed at a boundary between the floor panel main body 310 and the tire pan 312, respectively.

The rear floor panel 302 has an uneven surface 315 formed by a plurality of the ridge lines 313 and 314. The uneven surface 315 is formed by an upper surface of the floor panel main body 310, one surface of the pair of tire houses 311 connected to the upper surface of the floor panel main body 310 via the ridge line 313, and one surface of the tire pan 312 connected to the upper surface of the floor panel main body 310 via the ridge line 314.

The rear floor panel 302 has a plurality of lateral beads 316 that extend in the input orthogonal direction V2. The plurality of lateral beads 316 line up in the load input direction V1. The lateral bead 316 is arranged on the uneven surface 315 across the ridge lines 313 and 314.

According to the third embodiment, the rear floor panel 302 has the uneven surface 315 formed by the plurality of ridge lines 313 and 314. The lateral bead 316 is arranged on the uneven surface 315 across the ridge lines 313 and 314. With the above configuration, the following effects are achieved.

The ridge lines 313 and 314 can increase rigidity in a load direction, the lateral bead 316 arranged on the uneven surface 315 across the ridge lines 313 and 314 can be easily crushed and deformed, and the difference between the peak load Lp and the average load La can be further reduced. In addition, the existing vehicle body panel having the uneven surface 315 can be utilized as the rear floor panel 302, thus eliminating a need for additional parts. Thus, the weight of the vehicle body rear structure 301 can be reduced and a collision performance can be improved.

Fourth Embodiment

In the first embodiment, an example in which the vertical bead is arranged on the rear floor panel has been described, but the disclosure is not limited thereto. A fourth embodiment differs from the first embodiment described above in an aspect of a rear upper panel of a vehicle body rear structure. Note that, in the following description, the same configurations as those in the first embodiment described above are designated by the same signs and the descriptions thereof are omitted.

Figure 6:
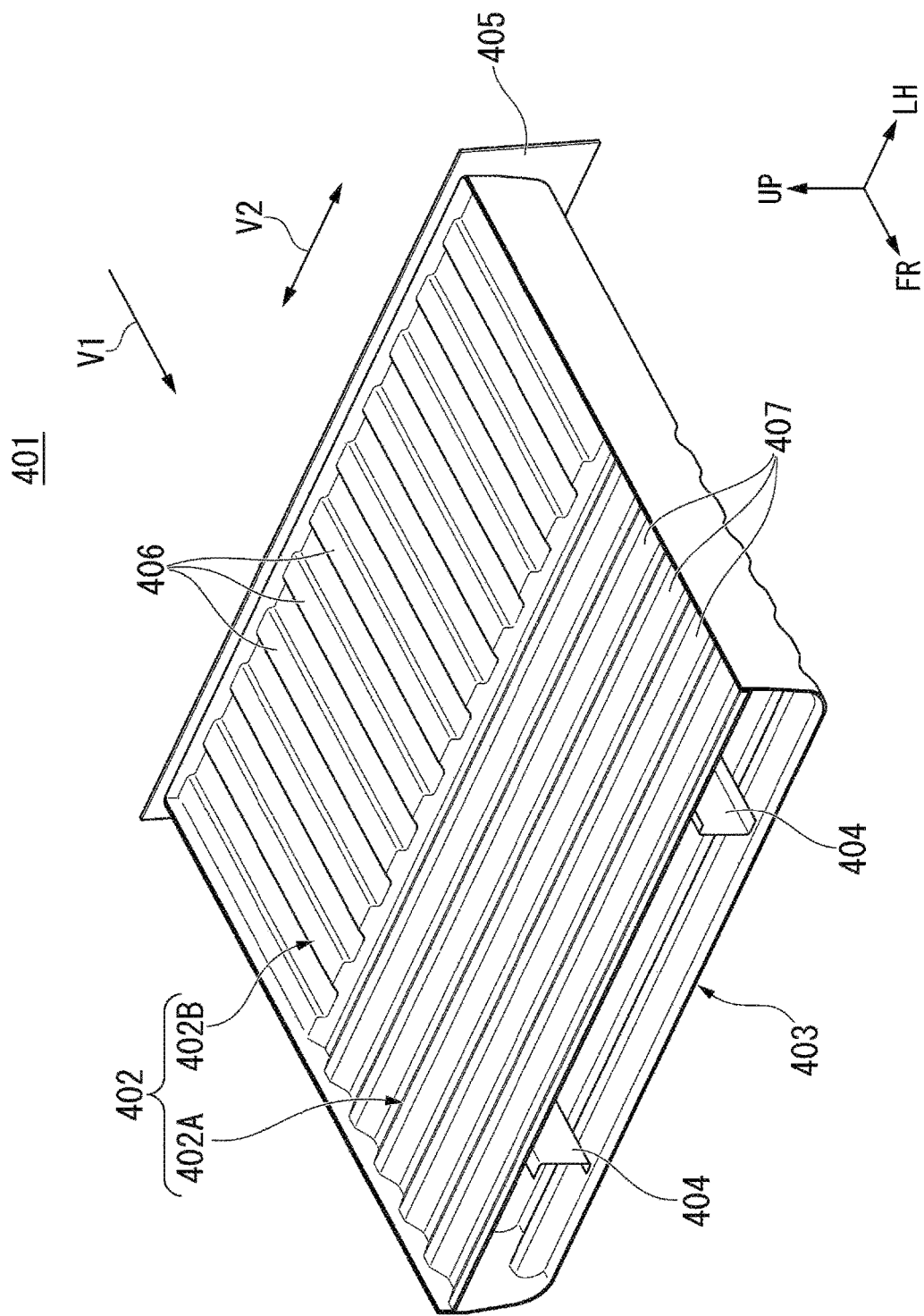
FIG. 6 is a perspective view of a vehicle body rear structure according to a fourth embodiment.

As shown in FIG. 6, a vehicle body rear structure 401 includes a rear upper panel 402 (rear floor panel), a rear lower panel 403 (rear floor panel), a pair of left and right support members 404, and a rear gusset 405.

The rear upper panel 402 has a plurality of vertical beads 406 that extend in the load input direction V1 and line up in the input orthogonal direction V2, and a plurality of lateral beads 407 that extend in the input orthogonal direction V2 and line up in the load input direction V1. The plurality of vertical beads 406 are arranged adjacent to a rear end portion of the plurality of lateral beads 407 (a rearmost lateral bead 407).

The plurality of vertical beads 406 extend in the front-rear direction and line up in the vehicle width direction on a rear portion 402B of the rear upper panel 402. Each of the plurality of vertical beads 406 extends with the same length. Each interval between the plurality of vertical beads 406 in the vehicle width direction (an interval between two adjacent vertical beads 406) is the same.

The plurality of lateral beads 407 extend in the vehicle width direction and line up in the front-rear direction on a front portion 402A of the rear upper panel 402. Each of the plurality of lateral beads 407 extends with the same length. Each interval between the plurality of lateral beads 407 in the front-rear direction (an interval between two adjacent lateral beads 407) is the same.

The rear upper panel 402 is a so-called hot stamp molded product formed by hot stamping (hot pressing). A part of the rear upper panel 402 on a side where a load at the time of collision (the rear portion 402B of the rear upper panel 402) is uncured. The rear portion 402B of the rear upper panel 402 is formed to be softer than the front portion 402A of the rear upper panel 402.

For example, by stopping heating or slowly cooling the rear portion 402B of the rear upper panel 402, the rear portion 402B of the rear upper panel 402 can be made softer than the front portion 402A of the rear upper panel 402. For example, by quenching and curing the front portion 402A of the rear upper panel 402, the front portion 402A of the rear upper panel 402 can be made harder than the rear portion 402B of the rear upper panel 402.

According to fourth embodiment, the rear upper panel 402 has the plurality of vertical beads 406 that extend in the load input direction V1 at the time of collision and line up in the input orthogonal direction V2, and the plurality of lateral beads 407 that extend in the input orthogonal direction V2 and line up in the load input direction V1, and thereby the following effects are achieved.

Compared with a case where the rear upper panel 402 has only the plurality of vertical beads 406 or a case where the rear upper panel 402 has only the plurality of lateral beads 407, the peak load Lp at the time of collision can be reduced, and the difference between the peak load Lp and the average load La can be further reduced. Thus, the impact energy can be absorbed more actively by the beads 406 and 407.

According to the fourth embodiment, the rear upper panel 402 is the hot stamp molded product. The part of the rear upper panel 402 on the side where the load at the time of collision is uncured. With the above configuration, the following effects are achieved.

Because the hot stamp molded product is formed by heat press molding, the beads 406 and 407 can be easily formed into a desired shape. In addition, by stopping heating or slowly cooling the uncured part (a part to be softened) in the rear upper panel 402, the peak load Lp at the time of collision can be easily reduced.

Fifth Embodiment

In the first embodiment, an example in which the vertical bead on the rear floor panel has a simple linear shape has been described, but the disclosure is not limited thereto. A fifth embodiment differs from the first embodiment described above in an aspect of a vertical bead of a rear floor panel. Note that, in the following description, the same configurations as those in the first embodiment described above are designated by the same signs and the descriptions thereof are omitted.

Figure 7:
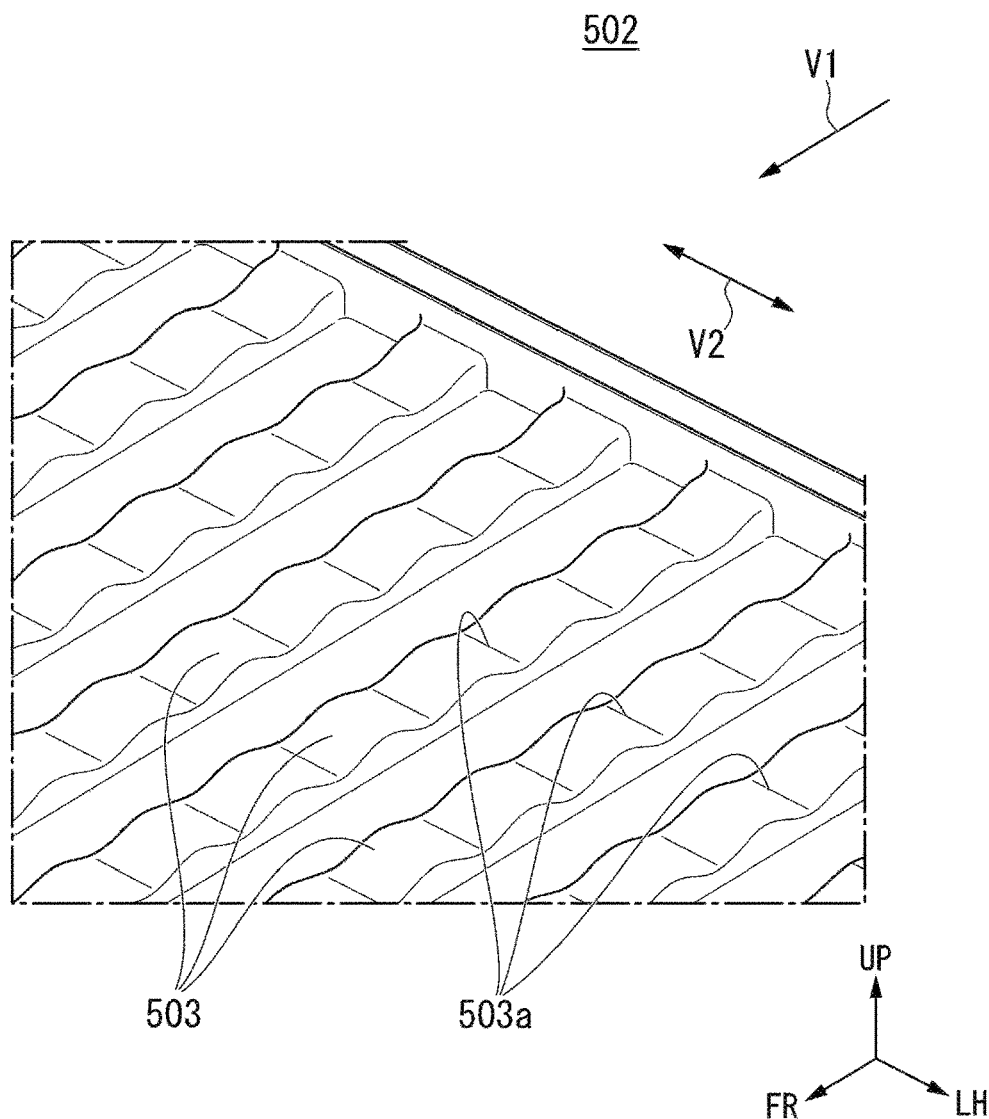
FIG. 7 is a perspective view of a rear floor panel according to a fifth embodiment.

As shown in FIG. 7, a rear floor panel 502 has a plurality of vertical beads 503 that extend in the load input direction V1 at the time of collision and line up in the input orthogonal direction V2. Each of the plurality of vertical beads 503 has a wavy shape in the direction in which the vertical bead 503 extends. Each of the plurality of vertical beads 503 has a plurality of concave portions 503a that line up in the direction in which the vertical bead 503 extends. Each interval between the plurality of concave portions 503a in the front-rear direction (a pitch of the concave portions 503a, or a distance between centers of two adjacent concave portions 503a) is the same.

Figure 8:
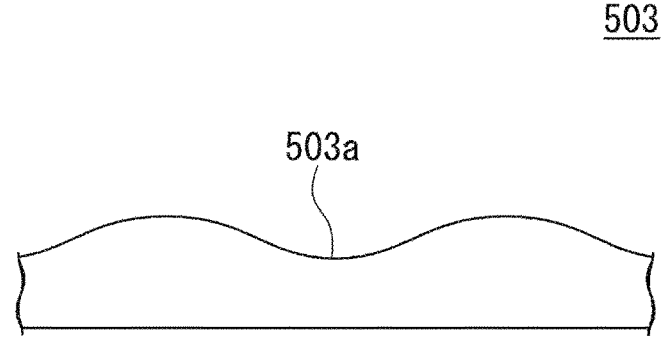
FIG. 8 is a side view of a vertical bead according to the fifth embodiment.

As shown in FIG. 8, the concave portion 503a has an arc shape that curves downward. A gradient (a slope angle of the wavy shape) of the concave portion 503a is set to be the same in each concave portion 503a. For example, a maximum height of the vertical bead 503 is set to 18 mm or more and 22 mm or less. For example, a maximum depth of the concave portion 503a is set to 8 mm or more and 12 mm or less.

According to the fifth embodiment, the rear floor panel 502 has the plurality of vertical beads 503 that extend in the load input direction V1 at the time of collision and line up in the input orthogonal direction V2. Each of the plurality of vertical beads 503 has the wavy shape in the direction in which the vertical bead 503 extends. With the above configuration, the following effects are achieved.

By increasing a depth of the concave portion 503a of the vertical bead 503 having the wavy shape, the peak load Lp at the time of collision can be easily reduced. Additionally, by changing the pitch and the slope angle of the wavy shape of the concave portion 503a, the peak load Lp at the time of collision can be changed, a generation load can be changed for each portion, and therefore collapsed locations of the entire panel can be controlled.

Figure 9:
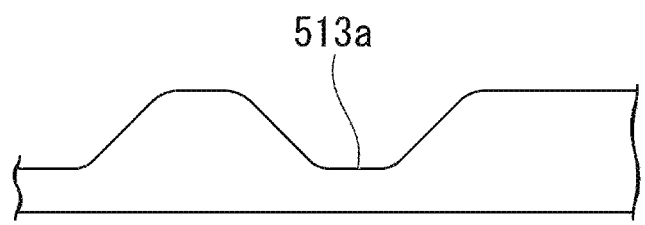
FIG. 9 is a side view of a vertical bead according to a variation example of the fifth embodiment.

In the fifth embodiment, an example in which the vertical bead 503 has the arc-shaped concave portion 503a that curves downward has been described, but the disclosure is not limited thereto. For example, as shown in FIG. 9, a concave portion 513a of a vertical bead 513 may have a trapezoidal shape that is recessed downward (an inverted trapezoidal shape). For example, an aspect of the concave portion can be changed according to required specifications.

Sixth Embodiment

In the first embodiment, an example in which the vertical bead on the rear floor panel has a simple linear shape has been described, but the disclosure is not limited thereto. A sixth embodiment differs from the first embodiment described above in an aspect of a bead of a rear floor panel. Note that, in the following description, the same configurations as those in the first embodiment described above are designated by the same signs and the descriptions thereof are omitted.

Figure 10:
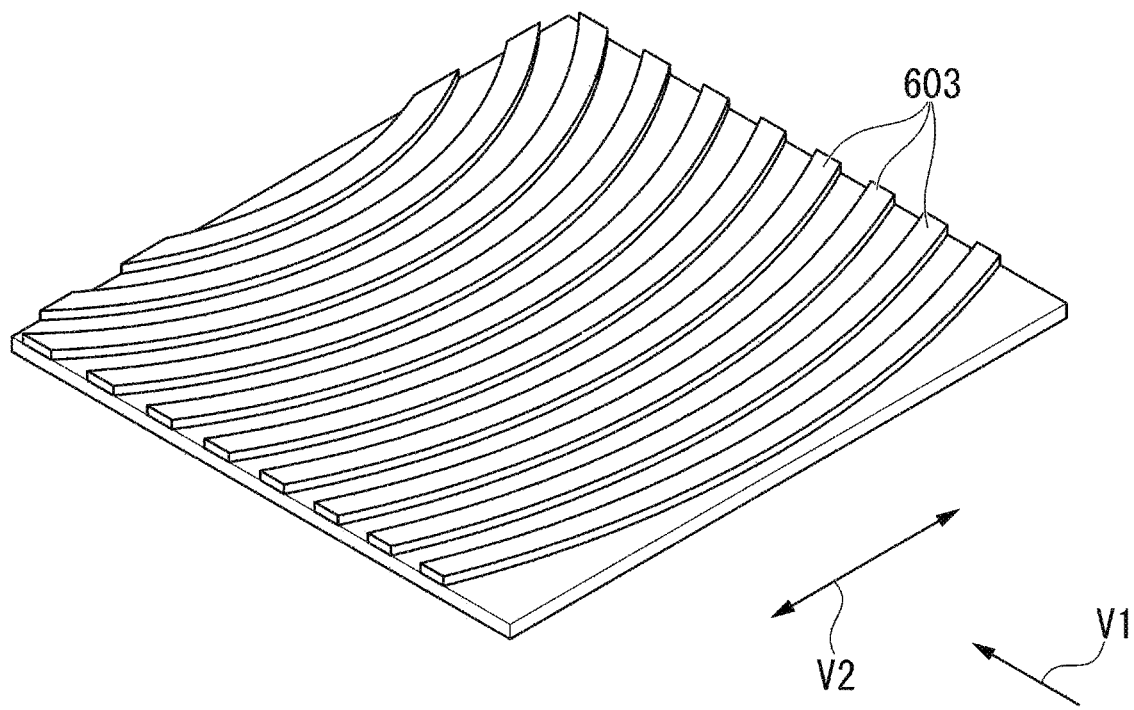
FIG. 10 is a perspective view of a rear floor panel according to a sixth embodiment.

As shown in FIG. 10, a rear floor panel 602 has a plurality of arc-shaped beads 603 that are curved in an arc shape toward a side opposite to the load input direction V1 and line up in the load input direction V1. Each of the plurality of arc-shaped beads 603 has the same radius of curvature. Each pitch between the plurality of arc-shaped beads 603 (a distance between centers of two adjacent arc-shaped beads 603) is the same.

According to the sixth embodiment, the rear floor panel 602 has the plurality of arc-shaped beads 603 that are curved in an arc shape toward a side opposite to the load input direction V1 at the time of collision and line up in the load input direction V1, and thereby the following effects are achieved.

Compared with a case where the rear floor panel has only the plurality of lateral beads, the peak load Lp at the time of collision can be increased and a deformation form of the entire panel can be controlled.

In the sixth embodiment, an example in which the arc-shaped bead 603 is curved in an arc shape toward the side opposite to the load input direction V1 has been described, but the disclosure is not limited thereto. For example, the arc-shaped bead 603 may be curved in an arc shape toward the side as the load input direction V1. For example, an aspect of the arc-shaped bead 603 can be changed according to required specifications.

Seventh Embodiment

In the first embodiment, an example in which the vertical bead on the rear floor panel has a simple linear shape has been described, but the disclosure is not limited thereto. A seventh embodiment differs from the first embodiment described above in an aspect of a bead of a rear floor panel. Note that, in the following description, the same configurations as those in the first embodiment described above are designated by the same signs and the descriptions thereof are omitted.

Figure 11:
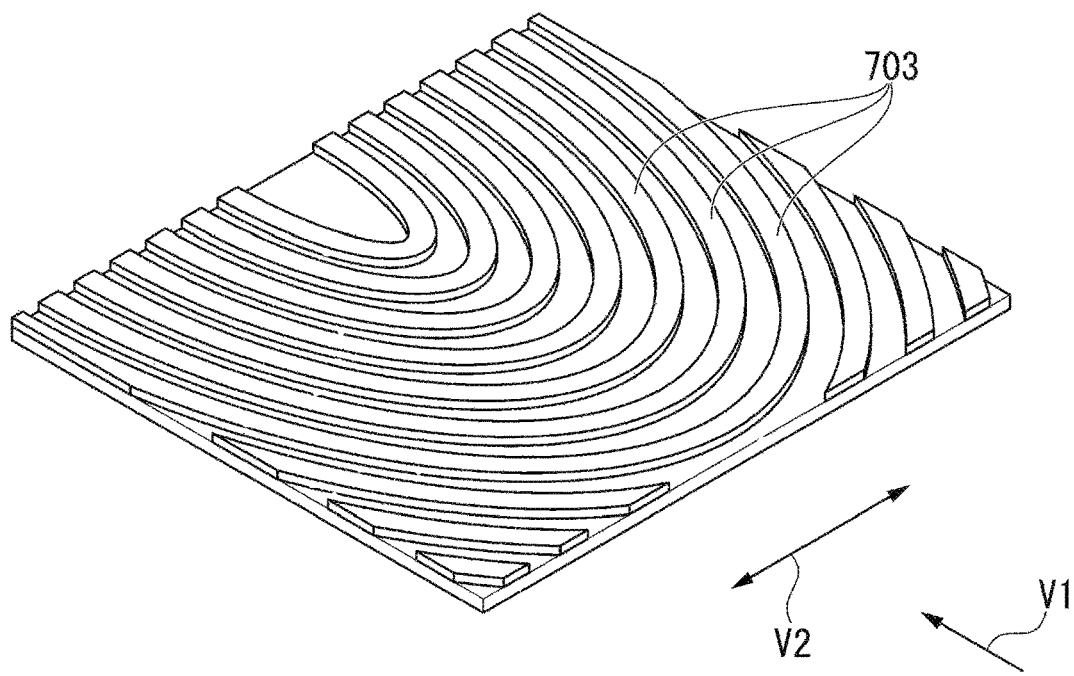
FIG. 11 is a perspective view of a rear floor panel according to a seventh embodiment.

As shown in FIG. 11, a rear floor panel 702 has a plurality of U-shaped beads 703 having a U-shape which opens toward the same side as the load input direction V1 and line up in the load input direction V1. Each pitch between the plurality of U-shaped beads 703 (a distance between centers of two adjacent U-shaped beads 703) is the same.

According to the seventh embodiment, the rear floor panel 702 has the plurality of U-shaped beads 703 having a U-shape which opens toward the same side as the load input direction V1 at the time of collision and line up in the load input direction V1, and thereby the following effects are achieved.

Compared with a case where the rear floor panel has only the plurality of vertical beads, the peak load Lp at the time of collision can be reduced.

In the seventh embodiment, an example in which the U-shaped bead 703 has a U-shape which opens toward the same side as the load input direction V1 has been described, but the disclosure is not limited thereto. For example, the U-shaped bead 703 may have a U-shape which opens toward the side opposite to the load input direction V1. For example, an aspect of the U-shaped bead 703 can be changed according to required specifications.

Eighth Embodiment

In the fourth embodiment, an example in which the plurality of vertical beads and the plurality of lateral beads are simply arranged adjacent to each other on the rear floor panel has been described, but the disclosure is not limited thereto. An eighth embodiment differs from the fourth embodiment described above in an aspect of arrangement of the plurality of vertical beads and the plurality of lateral beads on the rear floor panel. Note that, in the following description, the same configurations as those in the first embodiment described above are designated by the same signs and the descriptions thereof are omitted.

Figure 12:
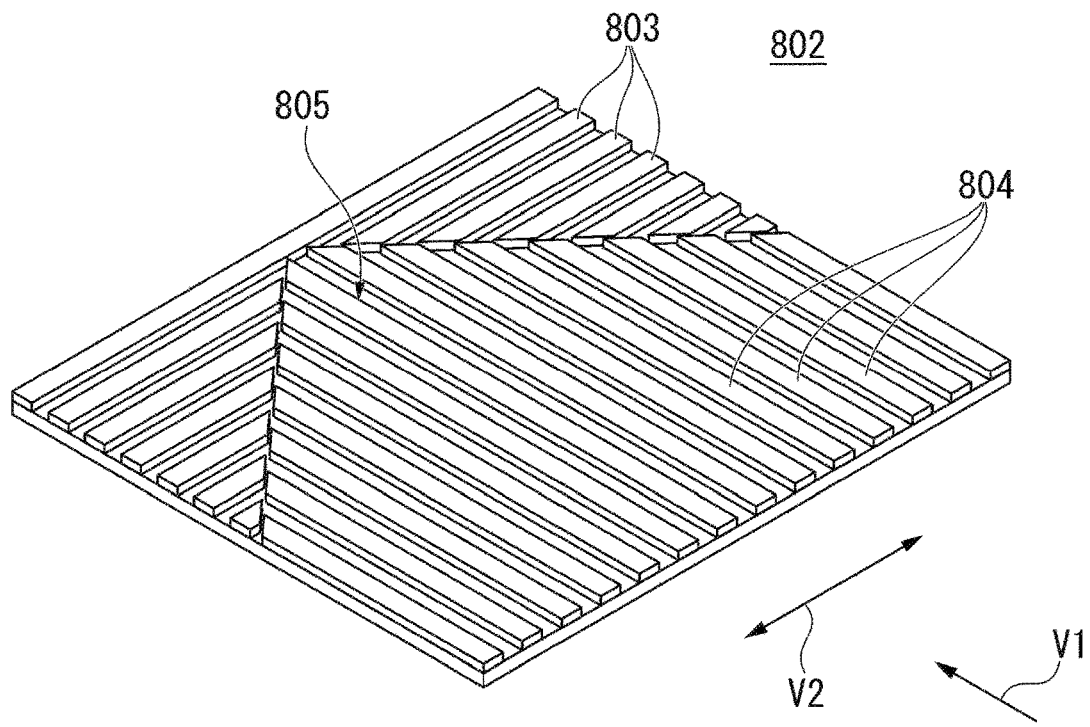
FIG. 12 is a perspective view of a rear floor panel according to an eighth embodiment.

As shown in FIG. 12, a rear floor panel 802 has a plurality of lateral beads 803 that extend in the input orthogonal direction V2 and line up in the load input direction V1, and a plurality of vertical beads 804 that extend in the load input direction V1 and line up in the input orthogonal direction V2. In the plurality of lateral beads 803, a V-shaped region 805 is formed which has a V-shape and opens toward the side opposite to the load input direction V1. The plurality of vertical beads 804 bite into the V-shaped region 805. The plurality of vertical beads 804 form a V-shape toward the same side as the load input direction V1 so as to correspond to the V-shaped region 805.

According to the eighth embodiment, the rear floor panel 802 has: the plurality of lateral beads 803 that extend in the input orthogonal direction V2 at the time of collision, line up in the load input direction V1, and have the V-shaped region 805 which has a V-shape and opens toward the side opposite to the load input direction V1; and the plurality of vertical beads 804 that extend in the load input direction V1, line up in the input orthogonal direction V2, and bite into the V-shaped region 805. Thereby, the following effects are achieved.

Compared with a case where the rear floor panel has a structure in which the plurality of vertical beads and the plurality of lateral beads are simply combined, the peak load Lp at the time of collision can be increased.

In the eighth embodiment, an example in which the plurality of lateral beads 803 has the V-shaped region 805 which has a V-shape and opens toward the side opposite to the load input direction V1 has been described, but the disclosure is not limited thereto. For example, the plurality of lateral beads 803 may have the V-shaped region 805 which has a V-shape and opens toward the same side as the load input direction V1. In this case, the plurality of vertical beads 804 may form a V-shape toward the side opposite to the load input direction V1 so as to correspond to the V-shaped region 805. For example, an aspect of the V-shaped region 805 can be changed according to required specifications.

Ninth Embodiment

In the first embodiment, an example in which the plurality of vertical beads on the rear floor panel have a simple linear shape has been described, but the disclosure is not limited thereto. A ninth embodiment differs from the first embodiment described above in an aspect of a plurality of beads on a rear floor panel. Note that, in the following description, the same configurations as those in the first embodiment described above are designated by the same signs and the descriptions thereof are omitted.

Figure 13:
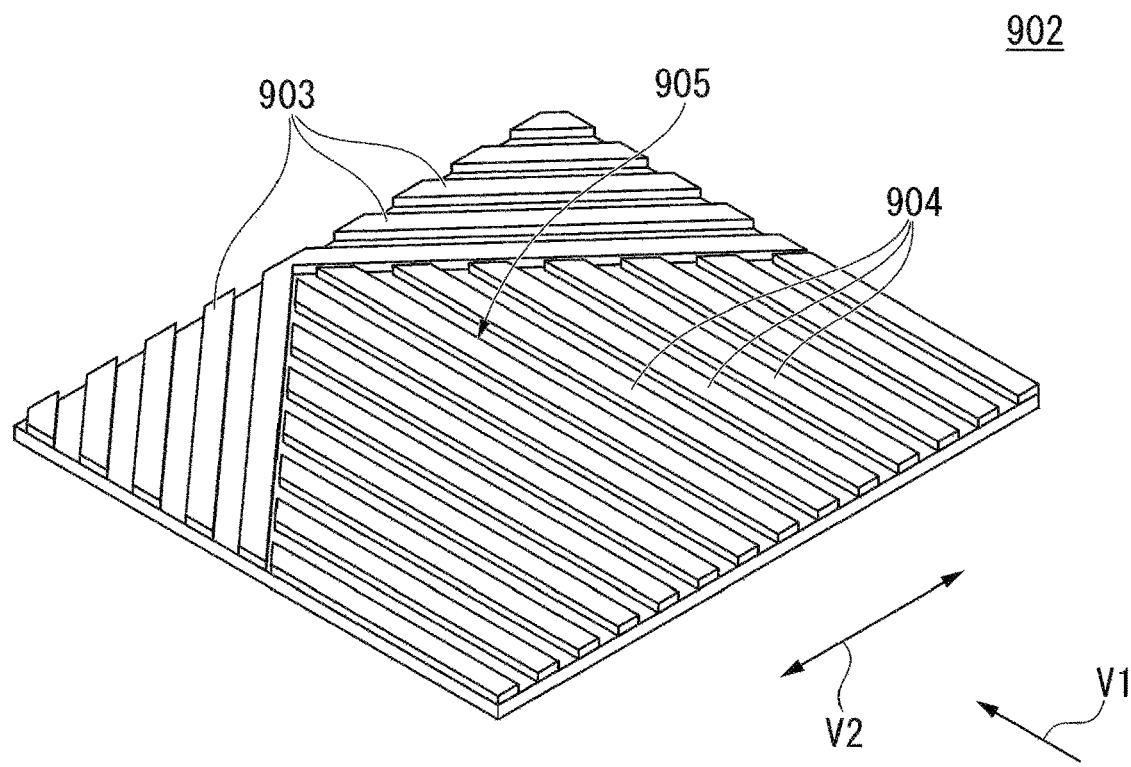
FIG. 13 is a perspective view of a rear floor panel according to a ninth embodiment.

As shown in FIG. 13, a rear floor panel 902 has a plurality of sloping beads 903 that extend in a direction diagonally intersecting the load input direction V1 and line up in the load input direction V1, and a plurality of vertical beads 904 that extend in the load input direction V1 and line up in the input orthogonal direction V2. The plurality of sloping beads 903 have a V-shaped region 905 that has a V-shape and opens toward the side opposite to the load input direction V1. The plurality of vertical beads 904 bite into the V-shaped region 905. The plurality of vertical beads 904 form a V-shape toward the same side as the load input direction V1 so as to correspond to the V-shaped region 905.

According to the ninth embodiment, the rear floor panel 902 has: the plurality of sloping beads 903 that extend in the direction diagonally intersecting the load input direction V1 at the time of collision, line up in the load input direction V1, and have the V-shaped region 905 that has a V-shape and opens toward the side opposite to the load input direction V1; and the plurality of vertical beads 904 that extend in the load input direction V1, line up in the input orthogonal direction V2, and bite into the V-shaped region 905. Thereby, the following effects are achieved. Compared with a case where the rear floor panel has only the plurality of vertical beads, the peak load Lp at the time of collision can be reduced.

Figure 14:
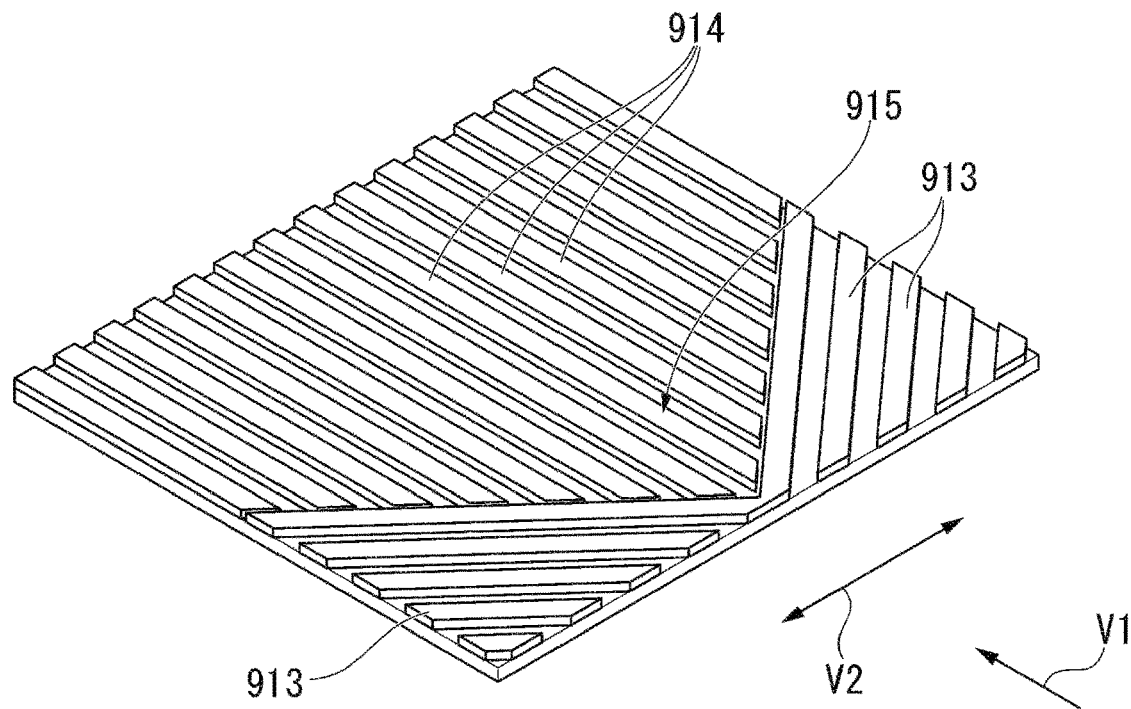
FIG. 14 is a perspective view of a rear floor panel according to a variation example of a ninth embodiment.

In the ninth embodiment, an example in which the plurality of sloping beads 903 have the V-shaped region 905 that has a V-shape and opens toward the side opposite to the load input direction V1 has been described, but the disclosure is not limited thereto. For example, as shown in FIG. 14, a plurality of sloping beads 913 may have a V-shaped region 915 that has a V-shape and opens toward the same side as the load input direction V1. In this case, a plurality of vertical beads 914 may form a V-shape toward the side opposite to the load input direction V1 so as to correspond to the V-shaped region 915. For example, an aspect of the V-shaped region can be changed according to required specifications.

Variation Example

For example, the rear floor panel may include a plurality of beads having at least two of the above-described vertical bead, lateral bead, arc bead, U-shaped bead, and sloping bead. Thereby, a folding mode at the time of collision can be changed depending on a method for placing the bead into the rear floor panel (a type of the bead, and an aspect of arrangement of the bead).

In the above embodiments, examples in which the vehicle body structure is the vehicle body rear structure arranged at the rear portion of the vehicle have been described, but the disclosure is not limited thereto. For example, the vehicle body structure may be a vehicle body front structure arranged at a front portion of the vehicle.

In the above embodiments, examples in which the panel is the rear floor panel that functions as a floor portion at the rear portion of the vehicle have been described, but the disclosure is not limited thereto. For example, the panel may be a front floor panel that functions as a floor portion at a front portion of the vehicle. For example, an aspect of the panel can be changed according to required specifications.

Although the preferred embodiments of the disclosure have been described above, the disclosure is not limited thereto. Additions, omissions, replacements, and other changes in configuration can be made, and the above-described variation examples can also be combined as appropriate without departing from the gist of the disclosure.

What is claimed is:

1. A vehicle body structure, comprising a panel formed by a steel plate having a tensile strength of 440 MPa or more, wherein the panel has a bead extending in a predetermined direction over an entire surface, and
the direction in which the bead extends and the type of the bead are set so as to reduce a difference between a peak load and an average load at the time of collision,
wherein the panel is a rear floor panel; and
the rear floor panel comprises:
a plurality of lateral beads that extend in a direction orthogonal to a load input direction at the time of collision and line up in the load input direction; and
a plurality of vertical beads that extend in the load input direction, line up in the direction orthogonal to the load input direction, and connect the plurality of lateral beads adjacent to each other.

2. The vehicle body structure according to claim 1, wherein the panel has an uneven surface formed by a plurality of ridge lines, and
the bead is arranged on the uneven surface across the ridge lines.

3. The vehicle body structure according to claim 1, wherein
a rear portion of the rear floor panel has a higher strength than that of a front portion of the rear floor panel.

4. The vehicle body structure according to claim 1, wherein
each of the plurality of vertical beads has a wavy shape over a direction in which the vertical beads extend.

5. The vehicle body structure according to claim 1, wherein the panel has a plurality of arc-shaped beads that are curved in an arc shape toward the same side as a load input direction at the time of collision or a side opposite to the load input direction, and line up in the load input direction.

6. The vehicle body structure according to claim 1, wherein the panel has a plurality of U-shaped beads having a U-shape which opens toward the same side as a load input direction at the time of collision or a side opposite to the load input direction, and line up in the load input direction.

7. The vehicle body structure according to claim 1, wherein a pair of the panels is arranged in an up-down direction of a vehicle, and
the vehicle body structure further comprises a support member that extends in a load input direction at the time of collision and connects the pair of the panels.

8. The vehicle body structure according to claim 1, wherein the panel is a hot stamp molded product, and
a part of the panel on a side to which a load at the time of collision is input is uncured.

9. The vehicle body structure according to claim 1, wherein
the vehicle body structure further comprises a rear bumper beam that is continuously connected to a rear edge of the rear floor panel in a vehicle width direction.

10. A vehicle body structure, comprising a panel formed by a steel plate having a tensile strength of 440 MPa or more, wherein the panel has a bead extending in a predetermined direction over an entire surface, and
the direction in which the bead extends and the type of the bead are set so as to reduce a difference between a peak load and an average load at the time of collision,
wherein the panel comprises:
a plurality of lateral beads that extend in a direction orthogonal to a load input direction at the time of collision, line up in the load input direction, and have a V-shaped region that has a V-shape and opens toward the same side as the load input direction or a side opposite to the load input direction; and
a plurality of vertical beads that extend in the load input direction, line up in the direction orthogonal to the load input direction, and bite into the V-shaped region.

11. A vehicle body structure, comprising a panel formed by a steel plate having a tensile strength of 440 MPa or more,
wherein the panel has a bead extending in a predetermined direction over an entire surface, and
the direction in which the bead extends and the type of the bead are set so as to reduce a difference between a peak load and an average load at the time of collision,
wherein the panel comprises:
a plurality of sloping beads that extend in a direction diagonally intersecting a load input direction at the time of collision, line up in the load input direction, and have a V-shaped region that has a V-shape and opens toward the same side as the load input direction or a side opposite to the load input direction; and
a plurality of vertical beads that extend in the load input direction, line up in a direction orthogonal to the load input direction, and bite into the V-shaped region.

* * * * *